UNITED STATES PATENT OFFICE.

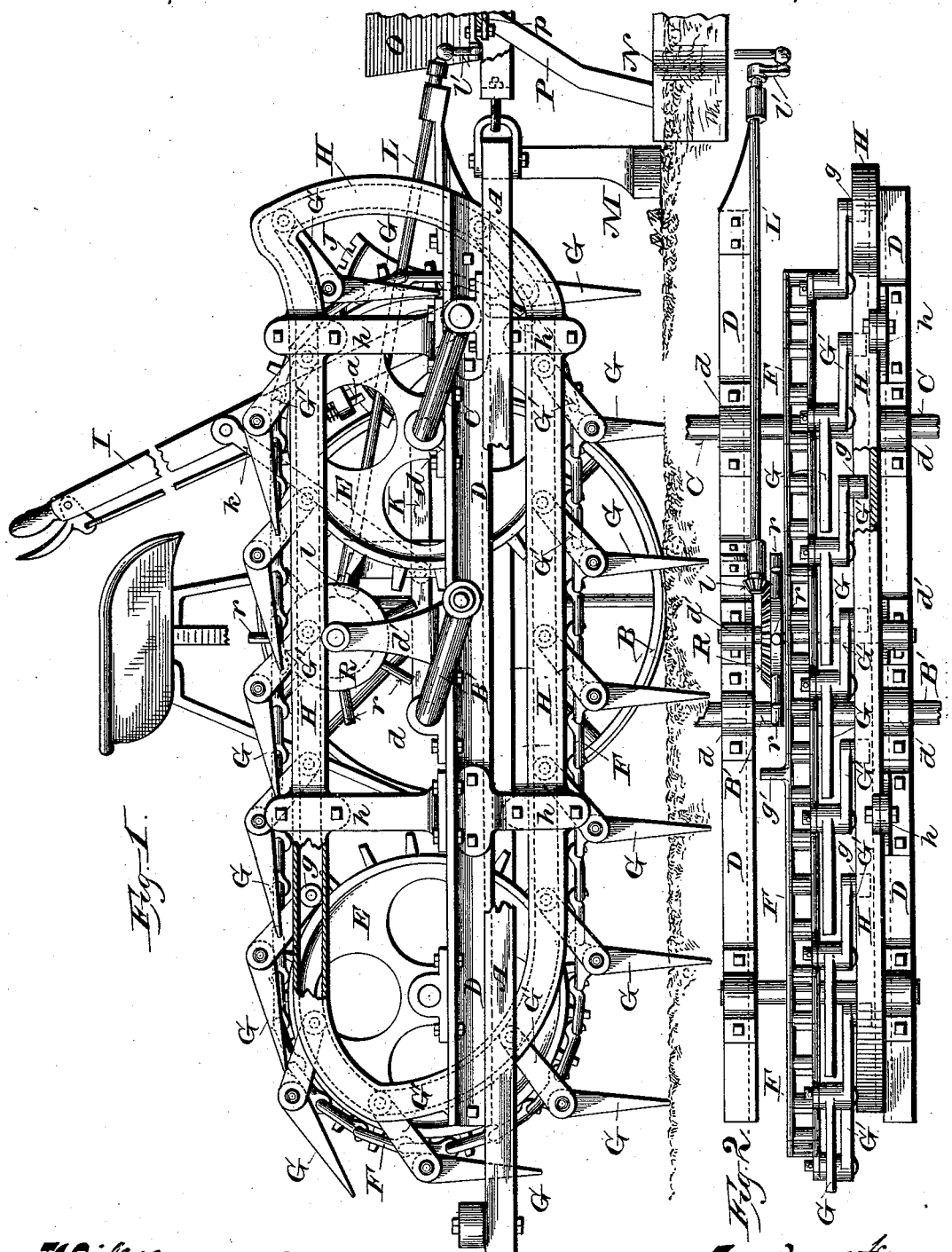

JOHN A. STONE, OF VAIL, IOWA.

SEED-PLANTER.

SPECIFICATION forming part of Letters Patent No. 469,755, dated March 1, 1892.

Application filed June 21, 1887. Serial No. 241,954. (No model.)

*To all whom it may concern:*

Be it known that I, JOHN A. STONE, of Vail, in the county of Crawford and State of Iowa, have invented certain new and useful Improvements in Seed-Planters; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The main objects of my invention are to plant corn in equidistant cross-rows and to facilitate the operation of planting.

It consists, essentially, of a rotary belt provided with projections arranged to engage with the ground, in combination with a corn-dropping device, mechanism connected with said dropping device and arranged to be operated by said belt at determinate intervals, mechanism for raising and lowering said belt, mechanism arranged to hold the projections on said belt vertically as they enter and are withdrawn from the ground, and other features hereinafter specifically set forth.

In the accompanying drawings like letters refer to the same parts in both figures.

Figure 1 is a side elevation of my improved machine, the front supporting-wheel being removed; and Fig. 2 is a plan view of a portion of the same.

Heretofore a wire stretched across the field to be planted and provided at the desired intervals for the hills with trip-blocks to engage and operate the dropper-actuating mechanism, or a wheel running upon the ground and arranged to engage and operate the dropper mechanism at intervals in its revolution, has been employed; but these devices are objectionable, because they are inconvenient to operate, inaccurate, and uncertain in their operation, or lack durability. These objections I aim to overcome in my improved machine.

Referring to the accompanying drawings, A A is the main frame of the machine, supported upon the wheels B, bearing upon the crank-axle B', which is supported and arranged to turn in boxes formed in or attached to the sides of said frame. It is designed to be attached at the front end, as shown in Fig. 1, to a seed dropper or planter of the usual or any suitable form and construction, in which O represents the seed-box, P the conduit leading therefrom to the ground, $p$ the slide by which the discharge of seed from box O is controlled, and N the shoe by which the drill or furrow is formed in the ground for the seed.

C is a crank-shaft formed with a crank of the same radius as the crank of axle B'. It is journaled at each side of the machine in boxes attached to frame A.

D D is a frame provided with boxes $d\ d$, which receive the cranks of axle B' and shaft C supporting said frame D.

E E are sprocket-wheels whose shafts are supported and bear in boxes in frame D, one of said sprocket-wheels being mounted upon the crank of shaft C. Upon the sprocket-wheels E E is mounted the chain belt F, to which are pivoted or hinged at regular intervals pins or teeth G G, extended inside of their jointed connections with said chain into the crank-arms G' G', which are provided at the ends with crank-pins and friction-rollers $g$.

H is a guideway supported upon brackets $h\ h$, attached to frame A in position to receive and guide the friction-rollers $g\ g$ and thereby hold the teeth G G in the desired position throughout their circuit.

R is a bevel-gear provided on its periphery at regular intervals with teeth or projections $r\ r$ and supported at one side of the chain belt G in bearings secured to frame D.

The chain F is provided on the side adjacent to the gear R and at determinate intervals equal to the distance desired between the hills or rows with lateral projections $g'$, which work with the teeth $r\ r$ on the periphery of the gear R.

L is a shaft set lengthwise of the machine in bearings attached to frame D and provided at its front end with a crank $l'$, which is connected with and actuates the seed-dropping slide $p$, and at the other end with a pinion $l$, working with the bevel-gear R.

I is a lever fulcrumed to frame A in a position accessible to the operator and provided with a spring-catch $a$, working with the notched segment J. It is connected by a link $k$ with a bar K, mounted upon and connecting the cranks of axle B' and shaft C, the turning of which by means of said lever raises or lowers the frame D and chain belt G, as desired.

M is a guard or scraper attached to the front end of frame A and arranged to clear the ground of obstacles directly in front of the teeth G as they enter the ground. The chain F is so located as to run between the seed drills or rows.

The operation is as follows: The machine having been brought to the starting-point, the frame D and sprocket-wheels E E are lowered by means of the lever I, so as to cause the pins or teeth G to engage with the ground, as seen in Fig. 1, sufficiently to rigidly hold the lower section of the chain fast or stationary. The teeth are caused to enter the ground more or less according to the character of the soil. If the soil is light, they are driven deeper in order to prevent any yielding or movement of the lower section of the chain; but if the soil is stiff and hard it will be sufficient to drive them at a less depth. The machine is now driven forward and the lower section of the chain F, being held fast by the pins G G in engagement with the ground, causes the sprocket-wheels to rotate and the upper section of said chain to travel past the gear R at the same rate of speed that the machine passes over the ground. The projections $g'$, engaging the teeth $r\,r$ on the periphery of the gear R, each cause the latter to make a determinate part of a revolution, which turns the shaft L a half-revolution and by its crank $l'$ moves the drop-slide $p$ to one side, thus discharging seed for a given number of hills in a row running transversely to the travel of the machine. The drop-slide is thus moved at exactly uniform intervals alternately from side to side by the projections $g'$, working with the teeth $r\,r$ of gear R. The guideway H is so formed as to cause the teeth G to enter and withdraw from the ground in a vertical position in order to insure an unvarying movement of the chain F corresponding exactly to the distance traversed by the machine. The teeth G, thus entering the ground, do not operate to accelerate or retard the movement of the chain independently of the advance of the machine. When the end of a row is reached, the chain and its teeth G are lifted from the ground and the machine turned into position to begin another row, the chain F being set by hand so as to trip the seed-dropping mechanism at the proper point of beginning. The chain is then lowered, the machine moved forward, and the operation continues as described. The guard or scraper M, grazing the surface of the ground just in front of the teeth G, removes any obstacles or obstructions which might deflect said teeth and cause a deviation in the proper movement of chain F.

I do not wish to confine myself to the device shown and described for holding the teeth G on chain F in a vertical position as they enter the ground or are withdrawn therefrom, as other means may be employed to accomplish that end without departing from the principle upon which my machine operates.

I claim—

1. In a check-row attachment for seed-planters, the combination of a suitable frame supported on wheels, a vertically-adjustable frame carried by the main frame and connected therewith so as to be raised and lowered uniformly and simultaneously at both ends, a belt mounted on suitable wheels having bearings in said vertically-adjustable frame, teeth hinged to said belt at intervals and provided with crank-arms, and a guide constructed and arranged to be traversed by said crank-arms and to hold said teeth vertically as they enter and are withdrawn from the ground and thereby insure a movement of said belt exactly corresponding with the advance of the machine, substantially as and for the purposes set forth.

2. In a seed-planter, the combination, with suitable seed-dropping mechanism, of a frame supported upon wheels, sprocket-wheels having bearings in said frame, a chain belt mounted upon said sprocket-wheels, teeth pivotally connected at intervals with said chain belt and provided with crank-arms, and a relatively fixed guide attached to the frame of the machine and constructed and arranged to be traversed by said crank-arms and to hold the teeth in a vertical position as they enter and are withdrawn from the ground, substantially as and for the purposes set forth.

3. In a check-row attachment for seed-planters, the combination, with the main frame, of a vertically-adjustable frame carried by two double cranks which have bearings in said main frame, a lever connected with and arranged to raise and lower said adjustable frame, sprocket-wheels having bearings in and supported by said adjustable frame, a chain belt carried by said sprocket-wheels, teeth hinged to said belt and provided with crank-arms having crank-pins, and a guide arranged to be traversed by said crank-pins and to hold said teeth in a vertical position as they enter and are withdrawn from the ground, substantially as and for the purposes set forth.

4. In a seed-planter, the combination, with a belt mounted upon suitable wheels and provided with teeth which are adapted to engage with the ground, of a seed-dropping slide, a crank-shaft connected therewith, a gear-wheel working with a pinion on said crank-shaft and provided with projections at intervals around or near its periphery, and projections provided at intervals on said belt and arranged to engage with the projections on said gear-wheel and intermittingly run the same, substantially as and for the purposes set forth.

5. The combination, in a seed-planter, with the drop-slide, of a chain belt provided with teeth pivoted thereto and constructed and arranged to engage with the ground on the under side of the belt, sprocket-wheels carrying said chain belt and having bearings in the frame of the machine, a guide constructed and arranged to direct and hold said teeth vertically as they enter and are withdrawn from the ground, and a gear connected with said drop-slide and arranged to be turned by projections on said chain belt at regular intervals corresponding with the distance between rows, substantially as and for the purposes set forth.

6. In a seed-planter, the combination of a suitable frame, a rotary belt mounted upon wheels having bearings in said frame, teeth hinged to said belt, and a guide constructed and arranged to engage with projections on said teeth and hold the same in a vertical position as they enter and are withdrawn from the ground, substantially as and for the purposes set forth.

In testimony that I claim the foregoing as my own I affix my signature in presence of two witnesses.

JOHN A. STONE.

Witnesses:
CHAS. L. GOSS,
GEORGE M. GOLL.